United States Patent [19]
Bellemare

[11] Patent Number: 5,639,307
[45] Date of Patent: Jun. 17, 1997

[54] FIBER BUNDLE COATING APPARATUS

[75] Inventor: David J. Bellemare, Durham, Conn.

[73] Assignee: Electrostatic Technology, Inc., Branford, Conn.

[21] Appl. No.: 372,682

[22] Filed: Jan. 17, 1995

[51] Int. Cl.$^6$ ............................................... B05C 19/00
[52] U.S. Cl. .................. 118/420; 118/426; 118/DIG. 5; 118/DIG. 19; 118/621; 118/641; 118/67
[58] Field of Search ..................... 118/50.1, 621, 118/641, 65, 67, 68, 405, 420, 426, DIG. 5, DIG. 19; 156/166, 180, 441, 273.1, 379.6

[56] References Cited

U.S. PATENT DOCUMENTS

| | | | |
|---|---|---|---|
| 2,730,455 | 1/1956 | Swann | 117/4 |
| 3,354,013 | 11/1967 | Terrell et al. | 156/152 |
| 3,586,560 | 6/1971 | Stranch et al. | 156/167 |
| 3,595,207 | 7/1971 | Stricker | 118/420 |
| 3,673,027 | 6/1972 | Spencer | 156/167 |
| 3,685,487 | 8/1972 | Massa | 118/420 |
| 3,703,396 | 11/1972 | Lamanche et al. | 117/21 |
| 3,707,024 | 12/1972 | Mayer, Jr. et al. | 28/75 |
| 3,742,106 | 6/1973 | Price | 264/131 |
| 3,817,211 | 6/1974 | Brown et al. | 118/630 |
| 3,916,826 | 11/1975 | Knudsen | 118/629 |
| 3,933,545 | 1/1976 | Wilkinson et al. | 118/420 |
| 4,098,927 | 7/1978 | Gray et al. | 427/195 |
| 4,442,788 | 4/1984 | Weis | 118/405 |
| 4,714,642 | 12/1987 | McAliley et al. | 428/113 |
| 5,094,883 | 3/1992 | Muzzy et al. | 427/185 |
| 5,171,630 | 12/1992 | Muzzy et al. | 428/294 |
| 5,236,743 | 8/1993 | Bates et al. | 118/420 |

OTHER PUBLICATIONS

John Muzzy, Babu Varughese, Vivan Thammongkol and Wayne Tincher, "Electrostatic Prepregging of Thermoplastic Matrices", (1989), 12 pages.

Primary Examiner—Laura Edwards
Attorney, Agent, or Firm—Ira S. Dorman

[57] ABSTRACT

A fiber bundle workpiece is coated with a particulate material during passage about a plurality of pulleys arranged to establish a serpentine travel path portion through a coating zone. The pulleys have arcuate grooves extending thereabout, which cause the fiber bundle to twist axially, and the fibers of the bundle move with respect to one another as the fiber bundle moves along the serpentine path. These two actions increase coating efficiency and the penetration of particulate material into the fiber bundle. The travel path portion will preferably lie in a horizontal plane, and the coating unit will normally constitute an electrostatic fluidized bed of particulate material. After exiting the coating zone, the fiber bundle may pass through an oven to partially melt the particulate material, and thereby cause the particles to adhesively attach to the fiber bundle. The fiber bundle, with particulate material attached thereto, may thereafter be collected and stored on a spool as an intermediate product for use in subsequent composite article manufacturing processes.

14 Claims, 2 Drawing Sheets

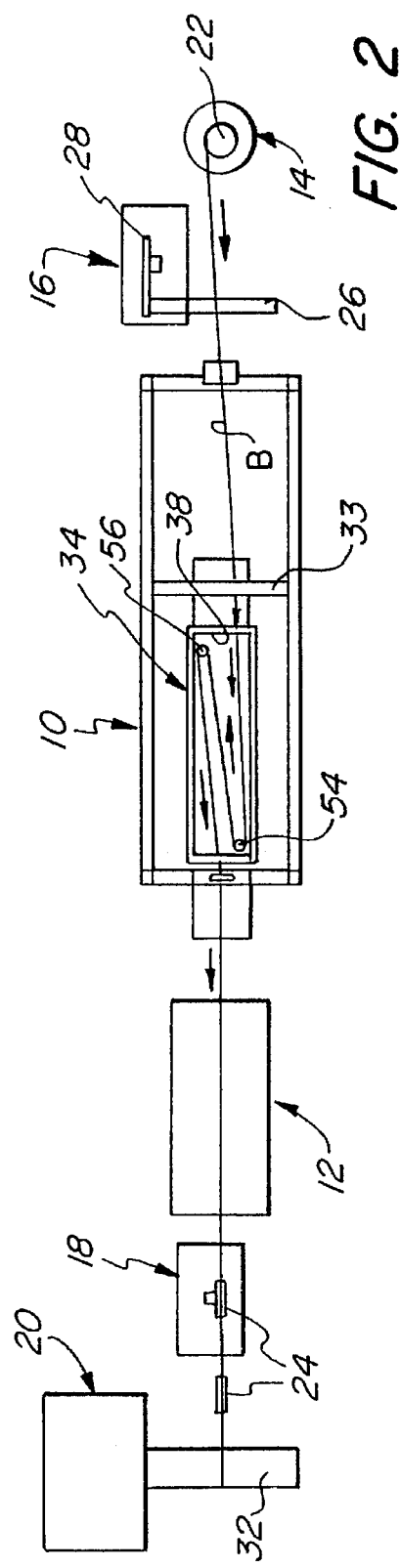
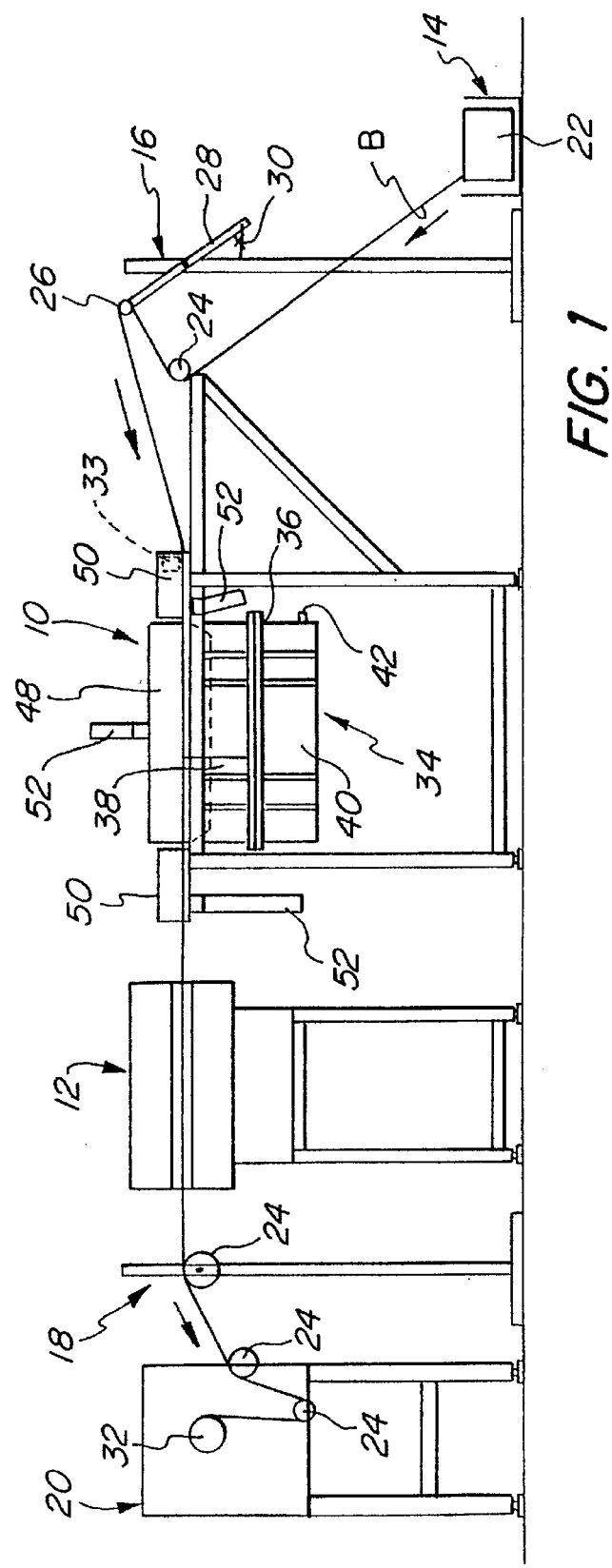

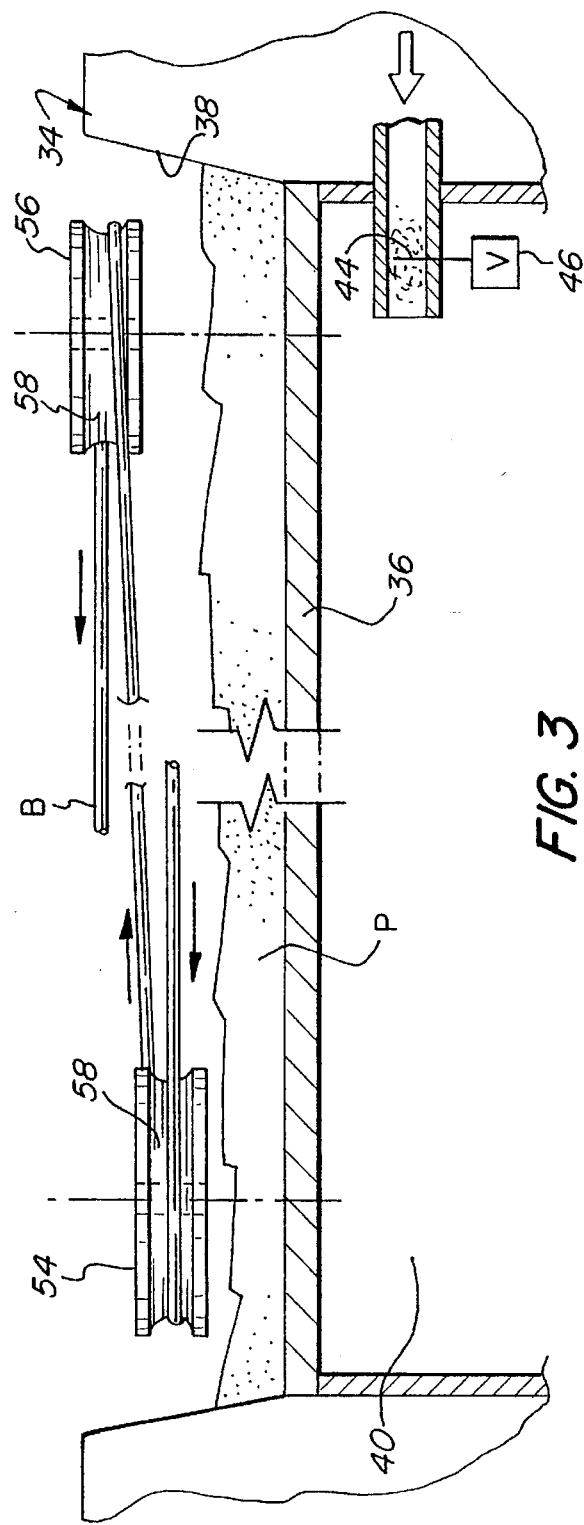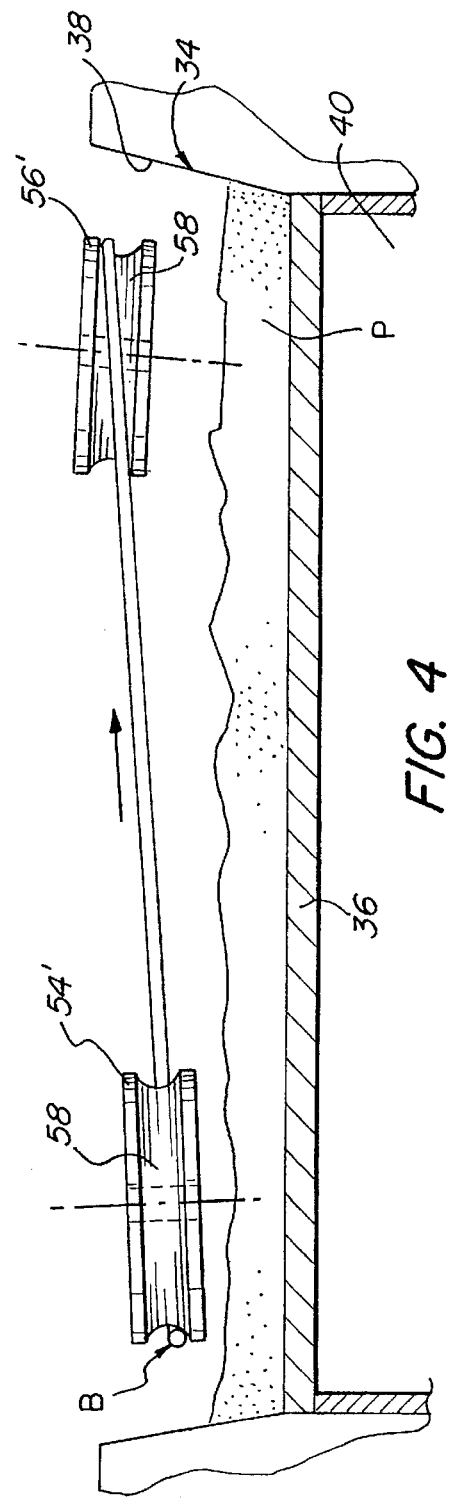

FIBER BUNDLE COATING APPARATUS

BACKGROUND OF THE INVENTION

Methods for applying particulate coating materials to continuous-length bundles of fibers (i.e., tow and roving) are well known in the art. Typical are the techniques described in the following U.S. patents:

Swann U.S. Pat. No. 2,730,455 provides a method for coating threads or roving in which a high-potential electrostatic field is employed to spread the fibers prior to coating.

In the method of Stranch et al, U.S. Pat. No. 3,586,560, the filaments of a strand are spread to a parallel relationship, by passage under tension across a surface of a rod-like member, preliminary to coating in a fluidized bed; particle adherence may be promoted by charging either the strand or the powder particles.

U.S. Pat. No. 3,354,013, to Terrell et al, discloses a method for applying particulate additives to a band of continuous filament tow in a fluidized bed, the additive being applied to both sides of the band during passage about rolls disposed in the bed.

The apparatus taught by Lamanche et al, U.S. Pat. No. 3,703,396, serves to separate individual fibers of a strand, using air currents or electrostatic charges, to effect coating with a resinous material, which may also be electrostatically charged.

In the method described in Spencer U.S. Pat. No. 3,673,027, the filaments of a strand to be coated are spread, and subjected to back-tension, as they enter a fluidized bed of particulate coating material.

Mayer, Jr., et al, U.S. Pat. No. 3,707,024, provides a method for electrostatically bulking and impregnating yarns.

In accordance with Price, U.S. Pat. No. 3,742,106, glass rovings are spread, and separated into bundles of filaments, as by passage over threaded bars, during powder impregnation in a fluidized bed.

Crossbars are utilized in Brown et al, U.S. Pat. No. 3,817,211, as electrodes for electrostatically charging the individual filaments of a strand to open it, as it passes thereabout under tension, and to promote impregnation by electrostatically charged particles.

In accordance with Gray et al, U.S. Pat. No. 4,098,927, glass roving is drawn under and over a series of bars to separate it into a number of bundles of filaments, to thereby promote entrainment of resin powder from a fluidized bed.

McAliley, U.S. Pat. No. 4,714,642, discloses the random decollimation of multifilamentary tow, so as to create a multitude of interstices between adjacent filaments for the receipt and retention of matrix-forming resin.

U.S. Pat. Nos. 5,094,883 and 5,171,630, to Muzzy et al, are directed to a "multiply towpreg," produced by powder coating (e.g., in an electrostatic fluidized bed) of filaments spread in a generally columnated manner and maintained under tension.

Despite such prior art, a substantial need exists for means by which particulate materials can be applied to a continuous length workpiece, comprised of a bundle of filaments, or fibers, in a manner that is less complicated, very efficient, and that readily produces a uniform distribution, and selectively controlled loading, of the coating material in the workpiece.

SUMMARY OF THE INVENTION

Accordingly, it is the broad object of the present invention to provide a novel method by which particulate materials can be deposited upon continuous length fiber, or filament, bundle workpieces, in a manner that is highly efficient and effective, and is capable of readily producing a uniform distribution of the material on the workpiece.

More specific objects of the invention are to provide such a method which is less complicated to carry out than comparable prior art methods, and by which selectively controlled levels of loading can readily be produced.

Related objects are to provide novel apparatus for implementing the method, which apparatus is relatively uncomplicated to manufacture, and is efficient, effective and relatively easy to employ.

It has now been found that certain of the foregoing and related objects of the invention are attained by the provision of apparatus comprising coating means for producing a mass of particulate coating material at a coating zone, and transport means including a plurality of direction-changing transport elements, preferably taking the form of rotatably mounted pulleys. Each such transport element is formed with a groove, normally of arcuate cross section, that extends circumferentially at least partially thereabout, for carrying a fiber bundle trained about the element, and the elements are preferably so arranged as to establish a serpentine travel path portion for the workpiece through the coating zone.

The coating means will desirably be a fluidized bed unit comprised of a housing and a generally planar porous support member, the support member being mounted in the housing in a substantially horizontal attitude, in the normal position of operation, and defining a fluidization, or coating, chamber above the plate and a plenum therebelow. The travel path portion will preferably lie generally in a horizontal plane, with the transport elements disposed substantially within the fluidization chamber. The transport elements may be positioned at different levels, relative to the porous plate, and they (or at least one of them) may be oriented on an axis that is canted relative to the plane of the porous plate. More specifically, the axes of rotation of two sequential pulleys, used as the transport elements, may be oppositely canted and directed outwardly toward the adjacent side of the area occupied by the travel path portion.

A desirable arrangement of the transport elements will be such as to cause the workpiece bundle to exit the travel path portion moving in substantially the same direction as it enters. The apparatus will normally include means for electrostatically charging particulate material supplied to the fluidization chamber, and the transport means will normally include units for continuously paying off and taking up the workpiece.

Other objects of the invention are attained by the provision of a method for depositing a particulate material upon a fiber bundle workpiece of continuous length, utilizing apparatus comprised as herein described. In accordance with the method, a mass of particulate material is produced at the coating zone, and the fiber bundle workpiece is passed along a direction-changing (preferably serpentine) travel path portion through the coating zone; most desirably, the bundle will be subjected to twisting about its axis during such passage. The level of tension to which the workpiece is subjected will generally not exceed that which is necessary for its effective transport through the apparatus. Coating will advantageously be effected from a cloud of electrostatically charged particles, with the workpiece at an electrical potential that is sufficiently different from that of the particles to promote deposition and adherence.

BRIEF DESCRIPTION OF THE DRAWINGS

FIG. 1 of the drawings is a diagrammatic, side elevational view of a coating system utilizing apparatus embodying the present invention;

FIG. 2 is a plan view of the system of FIG. 1;

FIG. 3 is a diagrammatic, side elevational view of the electrostatic fluidized bed utilized in the system of the foregoing Figures, drawn to a greatly enlarged scale; and FIG. 4 is a diagrammatic, end elevational view of an alternative form of coating apparatus embodying the invention, drawn to the scale of FIG. 3.

DETAILED DESCRIPTION OF THE ILLUSTRATED EMBODIMENTS

Turning initially to FIGS. 1 through 3 of the drawings, the system depicted comprises a coating unit, generally designated by the numeral 10, an oven generally designated by the numeral 12, a workpiece supply source or pay-off unit generally designated by the numeral 14, two stabilizer units generally designated by the numerals 16, 18, and a winder or take-up unit generally designated by the numeral 20. The fiber bundle workpiece "B" is taken from a supply reel 22 at the pay-off unit 14, and is passed sequentially about a first guide roll 24 and the laterally extending bar 26 of the more upstream stabilizer unit 16. The bar 26 extends from a pivotably mounted arm 28, which is biased in a clockwise direction (as depicted) by spring 30, generally at a force level just sufficient to take up slack in the moving bundle, and applying no more than minimal back-tension to it. After passing through the coating unit 10 and the oven 12, the bundle is directed by idler rolls 24 onto the spool 32 of the take-up unit 20.

The coating unit 10 includes a housing, generally designated by the numeral 34, which is separated by a horizontal porous plate 36 into a coating chamber 38 thereabove and a plenum 40 therebelow. Air is introduced into the plenum 40 through the supply conduit 42, shown in FIG. 3 to contain an electrode 44 connected to a high-voltage power supply 46 for ionizing the air prior to passage through the plate 36, which air in turn serves to electrostatically charge the powder "P" supported upon the plate 36. Such apparatus is well known in the art, and is described for example in Knudsen U.S. Pat. No. 3,916,826, the disclosure of which is hereby incorporated by reference in its entirety. Briefly, the charged, or ionized, air which passes upwardly through fluidizing plate 36 fluidizes and charges the powder coating material contained in coating chamber 38. In this way, an electrostatically charged and fluidized bed of powder coating material is maintained in the chamber 38. As will be described in more detail below, this powder coating material is applied to the fiber bundle workpiece "B" as the bundle "B" passes through the coating chamber of the fluidized bed unit.

A hood 48 overlies the coating chamber 38, and two partial enclosures 50 are disposed at the opposite ends of the housing 34; the hood 48 and the enclosures 50 are connected by ducts 52 to a dust collector, not shown. Enclosures 50 collect any powder that migrates out of coating chamber 38.

Disposed within the coating chamber 38 are two rotatably mounted pulleys or idler rolls 54, 56, which are substantially identical to one another and are formed with arcuate grooves 58 extending circumferentially entirely thereabout. The pulleys 54, 56 are spaced from one another adjacent the opposite ends and sides of the coating chamber 38, as best seen in FIG. 2.

At the point of entry into the coating unit 10, the bundle "B" passes beneath a laterally extending bar 33, which serves to constrain it to the level of the first pulley 54 (taken in the direction of movement of the workpiece along its travel path). The bundle passes from the first pulley about the second pulley 56, and thereafter outwardly from the chamber 38. It will be noted that the second pulley 56 is disposed (as is preferred) at a level substantially above the first pulley 54, which relationship (taken with the orientations of the pulleys) contributes to the optimal exposure of the fiber bundle to the particulate coating material.

The arcuate cross section of the grooves imparts a twisting action to the bundle, causing the bundle to change its angular orientation, or to rotate about its axis, as it moves through the coating chamber. It also causes the fibers of the bundle to vary their positions relative to one another. Both of these actions allow the particles of the coating material to more effectively coat the fibers and to better penetrate the bundle. The fibers of the bundle are also caused to temporarily spread slightly (in a direction transverse to the axis of the bundle, or laterally) during contact with the groove-defining surfaces, following which they quickly resume their collapsed relationship. This action contributes to the effectiveness of coating and particle penetration, and is enhanced by disposing the pulleys 54, 56 horizontally and at different levels (as shown), causing the fiber bundle workpiece to move at an angle to the planes in which the grooves of the pulleys lie. A transverse shearing effect is thereby generated, which promotes the momentary opening of the bundle. The serpentine travel path increases the residence time of the fiber bundle workpiece in the coating zone, to further promote effective and adequate powder coating, or impregnation, into the fiber bundle. It will be appreciated that path patterns other than serpentine, and additional passes through the coating chamber, can be employed if so desired.

Once the fiber bundle "B" exits the coating chamber 34, it will have the desired amount of powder material applied, or impregnated into it. The bundle "B" will thereafter pass through oven 12, in which the powder particles will be heated sufficiently to soften or begin to melt them, so that the particles become adhesively attached to the fibers of the bundle. The bundle "B" thereafter passes about idler rolls 24 and onto take-up spool 32 as a powder-adhering fiber bundle product. Spool 32 is driven by a motor (not shown) in winder 20.

The powder-impregnated fiber bundle product can later be removed from spool 32 and utilized in various processes of the composite industry, such as filament winding, braiding, weaving and automatic fiber placement. Since the powder in the bundle has been only partially melted, or heated to the point of becoming soft or tacky, the impregnated bundle "B" remains quite flexible for use in all of the above processes, especially braiding and weaving which require the greatest flexibility. After the impregnated bundles "B" have been filament wound, braided or woven, they would be subjected (at least for certain applications) to sufficient heat and pressure to fully liquify the powder particles and cause them to wet-out the fibers in the bundle, thereby to produce a composite article.

Turning now to the alternate embodiment of FIG. 4, the arrangement of pulleys 54', 56' is the same as that which is shown in FIG. 3, except for the canting of the axes of the pulleys 54', 56' in opposite directions away from one another, outwardly toward the sides of coating chamber 38. This feature is believed to further benefit the quality of the deposit produced, by increasing twisting and shear forces applied to the bundle, and temporary spreading of the fibers, thus increasing fiber exposure and powder penetration into the bundle.

The ability to coat the workpiece effectively, without need to maintain lateral spreading of the constituent fibers, affords significant advantages over the practices taught in the prior art. It obviates any need for mechanical, pneumatic, or electrostatic lateral spreading means, as well as for tensioning to prevent premature collapsing of the fibers toward one another, or closing of the bundle. In so doing, moreover, the process and the apparatus are simplified, and there is a reduction of fiber breakage, which tends to occur in the use of conventional spreading and tensioning mechanisms.

Although the system depicted transports the bundle through the coating unit along a travel path that is disposed substantially in a horizontal plane, it will be appreciated that a vertical (or other) disposition may also be feasible. Also, while the apparatus described is designed for use in electrostatically applying the particulate material, it will be appreciated to have broader applicability; i.e., electrostatic attraction and adherence may not be required or desirable in all instances. Moreover, the powder supply need not constitute a fluidized bed unit, and coating with other means, such as by spraying or cascading of the powder, may be employed as appropriate.

Virtually any organic or inorganic particulate material can be utilized in the process, whether or not it is ultimately to be fused or otherwise altered for binding to the workpiece filaments. Representative materials include: thermosetting resins, such as epoxy resins, alkyd resins, polyamide resins, bismaleimide resins, phenolics, vinylester resins, unsaturated polyester resins; thermoplastic resins, such as polyolefins, polystyrene and other vinyl homo-polymers and copolymers, vinyl chloride polymers and copolymers, acrylic ester polymers, polyamides, cellulose derivatives, polyether-etherketone resins, polyphenylenesulfide resins, polysulfone resins, and saturated polyester resins; and inorganic powders, such as the phosphors, talc, chalk, and the like.

The composition of the fiber bundle workpiece is also not limiting of the invention, and may be comprise a wide range of natural and synthetic fibers such as of glass, minerals, cellulose acetate, polyesters, etc. One consideration in this respect is for the diameter of the pulleys or other transport elements to be sufficiently large to avoid excessive breakage of high-modulus (e.g., carbon) fibers. In addition, although freely rotatable pulleys or rolls will generally be preferred, the transport elements may take the form of rods, bars, and the like, suitably formed and finished (e.g., by polishing or coating) to ensure substantially frictionless movement of the fibrous workpiece thereabout.

Thus, it can be seen that the present invention provides a novel method by which particulate materials can be deposited upon, or impregnated into, continuous length fiber bundle workpieces, in a manner that is highly efficient and capable of readily producing a uniform distribution of the material on the workpiece. The method readily enables the production of selectively controlled levels of particulate loading. That is, greater amounts of particulate loading can be achieved by employing more rollers to increase dwell time, and the rollers can be designed and arranged to cause greater momentary spreading of the fibers or twisting of the fiber bundle, or both. Conversely, lower levels of particulate loading can be achieved by using fewer rollers to establish dwell time, and by designing and arranging them for less (or no) fiber spreading or bundle twisting.

The invention also provides novel apparatus for implementing the described method, which apparatus is relatively uncomplicated, as compared to prior art apparatus, and is highly efficient and relatively easy to employ. As will be appreciated by those skilled in the art, electrostatic deposition will typically employ charged particles, and will rely upon either grounding of the fiber bundle workpiece or upon its inherent electrical properties, under ambient conditions, to maintain the necessary difference in electrical potentials.

Having thus described the invention, what is claimed is:

1. Apparatus for depositing a particulate material upon a fiber bundle workpiece of continuous length, comprising:

a fluidized bed unit for producing a mass of particulate coating material at a depositing zone, said fluidized bed unit being comprised of a housing and a generally planar porous support member, said support member being mounted in said housing in a substantially horizontal attitude, in operation of said unit, and defining a fluidization chamber thereabove and a plenum therebelow; and transport means for transporting a fiber bundle workpiece through said depositing zone, said transport means including a plurality of transport elements disposed in said depositing zone and substantially within said fluidization chamber of said housing, each transport element having formed therein a circumferentially extending groove of arcuate cross section for carrying a fiber bundle workpiece trained thereabout, said transport elements being arranged to establish a travel path portion for the workpiece which changes the direction of movement of the workpiece during transport through said depositing zone, said travel patha portion lying generally in a horizontal plane in operation of said apparatus, and at least one of said transport elements being positioned at a level, relative to said porous plate, above the level at which another of said transport elements is positioned, said circumferentially extending grooves of said transport elements being disposed to generate and apply a transverse shearing effect to the fiber bundle workpiece as it passes from said one transport element to said another transport element.

2. The apparatus of claim 1 wherein said travel path portion is of serpentine configuration.

3. The apparatus of claim 2 wherein said transport elements are arranged to cause the fiber bundle workpiece to exit said serpentine travel path portion moving in substantially the same direction as it enters said serpentine travel path portion.

4. The apparatus of claim 1 wherein each of said transport elements comprises a rotatably mounted pulley.

5. The apparatus of claim 1 further including means for electrostatically charging particulate coating material supplied to said fluidization chamber of said housing.

6. The apparatus of claim 1 wherein said transport means further includes means for continuously paying off and taking up said fiber bundle workpiece.

7. Apparatus for depositing a particulate material upon a fiber bundle workpiece of continuous length, comprising:

a fluidized bed unit for producing a mass of particulate coating material at a depositing zone, said fluidized bed unit being comprised of a housing and a generally planar porous support member, said support member being mounted in said housing in a substantially horizontal attitude, in operation of said unit, and defining a fluidized chamber thereabove and a plenum therebelow; and transport means for transporting a fiber bundle workpiece through said depositing zone, said transport means including a plurality of transport elements disposed in said depositing zone and substantially within said fluidization chamber of said housing, each of said transport elements comprising a rotatably mounted pulley, and at least one of said pulleys being oriented to rotate about an axis that is canted relative to the plane of said porous support member.

8. The apparatus of claim 7 wherein said travel path portion lies generally in a horizontal plane in operation of said apparatus.

9. The apparatus of claim 8 wherein at least one of said transport elements is positioned at a level, relative to said porous plate, above the level at which another of said transport elements is positioned, and wherein said circumferentially extending grooves of said transport elements are disposed to generate and apply a transverse shearing effect to the fiber bundle workpiece as it passes from said one transport element to said another transport element.

10. The apparatus of claim 7 wherein another of said pulleys is oriented to rotate about an axis that is canted relative to said plane, and wherein said travel path portion occupies an area of lateral extent, bounded by opposite side margins, and of longitudinal extent bounded by opposite end margins, said one and another pulleys being disposed adjacent opposite side margins and opposite end margins of said area, and each of said axes of rotation being canted in a direction toward the one of said side margins to which said one and said another pulley is adjacent, respectively.

11. The apparatus of claim 7 wherein said direction-changing travel path portion is of serpentine configuration.

12. The apparatus of claim 7 wherein at least one of said transport elements is positioned at a level, relative to said porous support member, above the level at which another of said transport elements is positioned.

13. The apparatus of claim 7 wherein said apparatus further comprises a power supply and an electrode element, said electrode element being operatively connected to said power supply and being disposed for effecting electrostatic charging of particulate material supplied to said fluidization chamber.

14. The apparatus of claim 7 further comprising an oven located downstream from said fluidized bed for applying heat to a fiber bundle workpiece, transported therethrough, to partially melt a particulate material which coats the fiber bundle workpiece and thereby to effect adhesive attachment of the particulate material to the fiber bundle workpiece.

* * * * *